United States Patent [19]

Yano et al.

[11] 4,055,674
[45] Oct. 25, 1977

[54] METHOD FOR THE REMOVAL OF AFLATOXIN FROM CEREALS, OIL SEEDS AND FEEDSTUFFS

[75] Inventors: Nobumitsu Yano; Itaru Fukinbara, both of Tokyo; Koji Yoshida; Tokiyoshi Korenaga, both of Sakaimachi, all of Japan

[73] Assignee: Asahi Kasei Kogyo Kabushiki Kaisha, Osaka, Japan

[21] Appl. No.: 696,148

[22] Filed: June 14, 1976

[30] Foreign Application Priority Data

June 17, 1975 Japan .................................. 50-72722

[51] Int. Cl.$^2$ ................................................ A23L 3/00
[52] U.S. Cl. ...................................... 426/430; 210/39; 426/331; 426/335
[58] Field of Search ............... 426/286, 310, 320, 331, 426/335, 532, 429, 430; 424/339, 342; 260/112 R; 21/58; 210/502, 39

[56] References Cited

U.S. PATENT DOCUMENTS

| 1,968,847 | 8/1934 | Morrell | 210/502 X |
| 3,900,288 | 8/1975 | Levine | 426/320 X |

OTHER PUBLICATIONS

Abstract-82:26674r-"Observation on the thin layer chromatographic development of corn extracts with ethyl ether," 1974.
Abstract-71:89651z "Adsorption of aflatoxin standards to glass" (1969).
Abstract-83:112574k, Detoxification of granudant oil, (1975).
Abstract-64:13281g "Detoxification of aflatoxin-contaminated peanuts intended for oil milling", (1966).

*Primary Examiner*—Frank W. Lutter
*Assistant Examiner*—N. Greenblum
*Attorney, Agent, or Firm*—Burgess, Dinklage & Sprung

[57] ABSTRACT

A method for the removal of Aflatoxin from materials including cereals, oil seeds and feedstuffs contaminated therewith comprising contacting said materials with a mixed solvent system of liquid dimethyl ether and water. The water is employed in an amount of 2 to 8 % by weight with respect to the liquid dimethyl ether. Such method which can reduce the Aflatoxin content to 15 ppb or less, can be conducted at low temperatures so that no proteins contained therein are denaturated. Further, the spent solvent system containing Aflatoxin can be easily regenerated by contacting it with activated carbon and recycled.

9 Claims, No Drawings

METHOD FOR THE REMOVAL OF AFLATOXIN FROM CEREALS, OIL SEEDS AND FEEDSTUFFS

This invention relates to a method for the removal of Aflatoxin from cereals, oil seeds and feedstuffs which are contaminated therewith, by the use of a mixed solvent system comprising liquid dimethyl ether and water. More particularly, this invention relates to a method for the complete removal or elimination of a carcinogenic poisonous substance produced by a mold, which is named "Aflatoxin", from those cereals, oil seeds and feedstuffs contaminated with said substance through extraction in an extraction system containing liquid dimethyl ether and water.

The term "cereal" as used herein means to refer to any cereals, which are normally ingestable orally in any optional form of raw or processed grains and meals such as rice and so on. The term "oil seed" as used herein means to refer to any oil seeds, which are normally edible in any optional form of raw or processed grains, meals and cakes, such as peanut, peanut meal, cotton seed, cotton seed meal, cotton seed cakes and so on. The term "feedstuff" as used herein refers to any other materials which may be employed for preparing a feed of domestic animals.

It is well-known in the art of Aflatoxin is one sort of those toxins produced by a variety of molds, of an extremely high carcinogenicity and a typical one produced by a microbe belonging to *Aspergillus flavus* and growing on foodstuffs such as grains. It is generally realized that such materials as peanuts, cotton seeds, rice and the like are easily susceptible to contamination with this toxin and thus badly damaged thereby.

Such foodstuffs or feedstuffs are generally classified into those for a food, a feed and others not employed for a feed, in accordance with the prescribed regulations which may vary depending upon the respective countries. Generally speaking, those stuffs containing Aflatoxin at a concentration not less than 30 ppb are considered as improper for a food as announced from WHO and FAO. According to the latest report from FDA, a lower content, namely not more than 15 ppb, on Aflatoxin has been settled for a food in U.S.A. in view of the fact that the Aflatoxin possesses a remarkably high carcinogenic activity.

It is, however, said that an extremely high level of contamination with Aflatoxin in products tends to be made in a peanut- or cotton seed-producing district in the world, especially in the area where an atmospheric temperature is rather higher and also that approximately 25% of harvested peanuts contain Aflatoxin at a concentration beyond the regulated limit even in U.S.A. Even if the product contaminated with Aflatoxin is not applied for a food but a feed, domestic fowls or poultries are particularly sensitive to Aflatoxin and thus liable to have carcinogenesis even at a lower concentration thereof.

Furthermore, from the contaminated peanuts or cotton seeds are generally extracted the corresponding oils by means of, what is called, a prepress solvent method, but Aflatoxin is unable to be extracted with an oil extracting solvent commonly employed for such purposes, which results in an increased concentration of Aflatoxin to approximately twice or more in the so produced oil cake or meal. These highly contaminated cakes or meals should be, therefore, utilized solely for a fertilizer or burnt up without any possibility of being used for a feed. For instance, it is reported in "AFLATOXIN Food Science and Technology" by Leo A. Goldbatt (Acedemic Press), page 351 that extraction of raw peanuts containing 5,500 ppb of Aflatoxin with n-hexane leaves peanut meal of an increased Aflatoxin concentration of 11,000 ppb and also extraction of said raw peanuts by the press method only leaves peanut meal of an Aflatoxin concentration of 7,000 ppb. These meals are obviously to be regarded as unsatisfactory for a feedstuff.

There have heretofore been proposed various methods for the removal of Aflatoxin from peanuts or cotton seeds contaminated therewith. Representatives of these prior methods may be summarized as hereunder.

1. A method for the chemical or physical decomposition of Aflatoxin; and
2. A method for the removal of Aflatoxin through extraction with a solvent.

In the above-mentioned method (1), the decomposition is generally accomplished by the use of an alkali. However, this method has not yet been commercially utilized, since it is difficult to demonstrate a nontoxicity of a decomposition product and, more significantly, proteins in the meal are proved to be decomposed and denaturated.

With respect to the above-mentioned method (2), there have been suggested a wide variety of procedures, but they are also not commercially utilized owing to respective drawbacks inherent therein. Common and most serious drawback is said to reside in its increasing cost, since a mixed solvent system comprising several sorts of different solvents should be used for the removal of Aflatoxin, different solvent systems should be applied to an oil-extraction step and an Aflatoxin-extraction step, respectively, and denaturation of proteins involved in a meal tends to proceed due to the use of an extremely high polar solvent and application of a considerably elevated temperature to the extraction step with said solvent and the removal step of said solvent.

As a result of our extensive studies in order to overcome or mitigate the above-mentioned drawbacks and difficulties in the prior art, it has been unexpectedly found that a carcinogenic substance, Aflatoxin, can be effectively removed or eliminated from cereals, oil seeds and feedstuffs contaminated therewith by the use of a mixed solvent system of liquid dimethyl ether and water and this invention has been completed upon this finding.

It is, accordingly, a primary object of this invention to provide an effective and advantageous technique for the removal of Aflatoxin from cereals, oil seeds and feedstuffs contaminated therewith.

Other objects and advantages of this invention will become apparent from the following disclosure.

According to this invention, there is provided a new and improved method for the removal of Aflatoxin from cereals, oil seeds and feedstuffs contaminated therewith which comprises subjecting said cereals, oil seeds and feedstuffs to extraction in an extraction system containing liquid dimethyl ether and water at temperatures not higher than those at which any proteins in said materials are thermally denatured, said water being employed in an amount of 2 to 8% by weight with respect to the liquid dimethyl ether.

The raw materials to which the present method may be applied are, as mentioned above, cereals, oil seeds and other feedstuffs which are contaminated with Aflatoxin. Typical examples thereof are raw peanuts, peanut meals, raw cotton seeds, cotton seed meals, cotton seed cakes and rice grains. It is to be noted that the raw materials may be of a raw state and, alternatively, of a defatted meal form available from an oil-extraction factory.

The liquid dimethyl ether to be employed in the extraction system of the present method, is a solvent having a boiling point of $-24.9°$ C., a weak polarity and a strong oil-extractability capable of dissolving 6.1% by weight of water at 20° C.

In the extraction system, the water content may be 2 - 8% by weight, preferably 3 - 7% by weight with respect to liquid dimethyl ether. In this case, a preferable and sufficient extraction can be achieved by employing 1 - 3 beds and 6 passes with respect to a raw material.

Extraction temperatures may be usually within the range of temperatures not higher than those at which any proteins in raw materials are thermally denatured, as pointed out hereinabove, with temperatures below ordinary temperature being preferred. Temperatures between 30° and $-30°$ C. are practically preferable, but any higher or lower temperatures may be satisfactorily applied, if they are industrially desirable.

Removal or elimination of the extracting solvent from an extraction residue may be easily conducted at temperatures below ordinary temperature due to the boiling point of liquid dimethyl ether of $-24.9°$ C., without any substantial denaturation of proteins during the processing.

In practicing the method of the present invention, a contaminated raw material is pulverized or finely divided to a particle size of around 12 mesh and placed into a pressure resistant vessel such as an autoclave. Subsequently, extraction is effected. When the Aflatoxin content of the material is as small as 50 ppb or less, that is, when the degree of contamination with Aflatoxin is very small, the removal of Aflatoxin may be accomplished by extraction with liquid dimethyl ether alone due to oil and/or water contained in the material. In general, however, the effective removal of Aflatoxin from the material is satisfactorily and efficiently attained by extraction in an extraction system containing liquid dimethyl ether and water. In order to realize the extraction in an extraction system containing liquid dimethyl ether and water, there may be employed any method for adding two components, namely liquid dimethyl ether and water as long as both of liquid dimethyl ether and water are present when extraction is effected. Illustratively stated, for example, there may be employed a method in which a required amount of water is added to liquid dimethyl ether to obtain a mixed solvent and then the extraction is effected using such mixed solvent; or a method in which a required amount of water is first added to the material and then liquid dimethyl ether is added in each extraction step. An amount of water to be added may vary depending upon the amount of liquid dimethyl ether employed, but it is desirable to use a saturating amount, namely an amount corresponding to 6.1 g. (at 20° C.) with respect to 100 g. of liquid dimethyl ether in each extraction step. For instance, where 1 kg. of a raw material of a water content 0% is employed, 2 kg. of liquid dimethyl ether per extraction and an amount of water corresponding to 6.1% with respect to 2 kg. of said ether, namely 122 g. of water may be added or, alternatively, an amount of water corresponding to 6.1% with respect to the required amount of liquid dimethyl ether for six times extractions, namely 732 g., of water is added before extraction procedures and then extraction with liquid dimethyl ether alone may be repeated six times. In such procedures, each extraction is actually effected with water-saturated liquid dimethyl ether owing to solubility of only 6.1% water in liquid dimethyl ether and the remaining water is adsorbed in the raw material, which results in little effusion of water-soluble proteins. When six extractions are completed, said raw material is dried approximately to its original state and Aflatoxin is simultaneously removed.

The amount of liquid dimethyl ether to be employed in the method of the present invention may vary depending upon the contamination level of the raw material as well as the degree of pulverization. Illustratively stated, for example, when the material is pulverized to have a size about 12 mesh and the method is carried out in a batchwise manner, the 4-time, 5-time and 6 to 8-time repeated extractions using 2 to 3 beds of liquid dimethyl ether are sufficient for complete removal of Aflatoxin for the prewetted materials having Aflatoxin contamination levels of 100, 300 and 500 ppb, respectively. When the material having the same pulverized size as above and the method is carried out in a continuous manner, the relatively slow (at a linear velocity of about 4 mm/min.) contacts of the materials with 7, 9 and 12 beds of a mixed solvent system of liquid dimethyl ether and water are sufficient for complete removal of Aflatoxin from the materials having Aflatoxin contamination levels of 100, 300 and 500 ppb, respectively.

The extraction may be conducted using a method as ordinarily employed in the extraction process, for example batchwise method, counter-flow method or the like.

All extracts from each step are passed through a suitable filter and the liquid dimethyl ether thus separated is evaporated with a slight heating, cooled, recovered and recycled to said vessel for reuse in subsequent extraction step. Such extraction procedures are repeated a number of times. After completion of the extractions, the treated raw material and the liquid dimethyl ether contained in the extracts are recovered in a conventional manner as described above to afford an Aflatoxin-free raw material, an oily phase containing Aflatoxin and an aqueous phase. Said oily and aqueous phases are easily separated by decantation and the so separated oily phase is treated, for example, by a conventional alkali decomposition method to make Aflatoxin non-toxic and further subjected to oil refining treatment, thereby yielding essential oil containing not more than 1 ppb of Aflatoxin.

According to the present method, simultaneous defatting and removal of Aflatoxin may also be effected with a raw material such as peanuts of either a raw or roasted state while keeping it in shape to afford the treated material with an Aflatoxin content below the regulated limit.

For treatment of the aqueous phase containing Aflatoxin which is discharged from the extraction system, we have also discovered that the Aflatoxin dissolved in liquid dimethyl ether-water can be readily removed therefrom by the use of activated carbon due to its adsorption activity. This leads to resolution of a waste water problem as well as regeneration of an extracting solvent without any application of distillation. More specifically, after the material to be treated is subjected to extraction using a liquid dimethyl ether-water system to remove Aflatoxin therefrom, the liquid dimethyl ether-water system containing Aflatoxin thus obtained can be treated as such with activated carbon for regeneration.

In practicing the adsorption of the Aflatoxin dissolved in the liquid dimethyl ether-water system, the amount of activated carbon to be employed can be determined by taking into consideration an equilibrium adsorption amount of the activated carbon. When the concentration of Aflatoxin in the liquid dimethyl ether-water system is 72 ppm, the equilibrium adsorption amount is 42.5 µg./g. for powdered activated carbon and 48 µg./10 g. for spherical activated carbon. For example, for adsorbing 100 µg. of Aflatoxin extracted from 100 g. of peanuts having an Aflatoxin concentration of 1 ppm with activated carbon, it is sufficient to employ 2.5 to 3.5 g. of powdered activated carbon or 15 to 25 g. of spherical activated carbon. The contacting time is preferably 5 to 30 minutes. In this connection, it is noted that when the activated carbon type absorbing column is employed by connecting it to Aflatoxin extracting system, the liquid dimethyl ether-water system containing Aflatoxin flows slowly and hence the Aflatoxin can be sufficiently contacted with the activated carbon to be effectively adsorbed into the carbon.

The mechanism of the removal of Aflatoxin according to the present method is not fully understood, but it is believed to be as follows:

Generally, it has been heretofore believed that Aflatoxin is insoluble in ethers. However, it was found to be soluble and extractable with the mixed solvent system of liquid dimethyl ether and water, as set forth hereinabove. Removal of Aflatoxin at so much lower concentration thereof as expressed in terms of ppm — ppb, which can be attained in this invention, is considered as distinctly different from dissolvability and extractability of the liquid dimethyl ether — water system, to be due to its activity of extruding or ejecting Aflatoxin from tissues of a raw material such as peanuts or cotton seeds. Since liquid dimethyl ether has a molecular weight of 46 and a diameter of not more than 5 A it tends to easily penetrate into tissues, as compared with other solvents.

According to our experiments, when raw peanuts and peanut meals (defatted cake obtained by a prepress method using n-hexane and dried to have a water content of 0%), both of which had been contaminated with 1,200 ppb of Aflatoxin, were each sufficiently contacted with liquid dimethyl ether alone at room temperature, it was found that the Aflatoxin contamination level of the raw peanuts was reduced to about 1,000 ppb while the Aflatoxin contamination level of the peanut meals could not be reduced and retained at 1,200 ppb. Such difference was found to be affected by the extractable oil and, especially, water contained in raw peanuts, leading to the method of this invention in which the contact of the Aflatoxin contaminated material with a liquid dimethyl ether — water system brings about large reduction of the Aflatoxin content to less than 15 ppb, namely the regulated limit in U.S.A. It is understood for us that the mechanism seems to be due to either a promoted penetration into tissues with a small amount of water incorporated in liquid dimethyl ether or dissociation and extrusion of Aflatoxin from tissues with liquid dimethyl ether and transportation of the dissociated Aflatoxin with a liquid dimethyl ether-water system.

Advantages of the present method may be summarized as indicated below.

1. One portion of Aflatoxin can be transferred into an aqueous phase and another portion into an oily phase in the same vessel as used for oil-extraction with a mixture of the same extracting solvent, namely liquid dimethyl ether and a small amount of water. In addition to the above, the Aflatoxin transferred into an oily phase can be readily decomposed to nontoxic state in a conventional manner to provide essential oil.

2. Extraction and removal of an extracting solvent system is feasible at lower temperatures.

3. Proteins are not substantially lost or denaturated.

4. Process can be industrially conducted at small cost, as compared with the prior art using a mixed solvent system.

5. Far more effective extraction of oils can be accomplished.

This invention will be more fully illustrated by the following Examples, but they are not constructed to be limiting the scope of this invention.

EXPERIMENT 1

Raw peanuts (7.2% water content, 51.0% crude fat and 26.3% crude protein) contaminated with 450 ppb of Aflatoxin ($B_1$ and $B_2$) were pulverized by means of a mixer and then passed through a 12 mesh screen to gather 150 g. of a peanut powder. The powder thus obtained was charged into a 1 liter volume pressure resistant vessel equipped with a magnetic stirrer and extraction was carried out with 450 g. of liquid dimethyl ether at room temperature for 30 minutes with stirring. After completion of the extraction, the powder was separated from the liquid dimethyl ether solution containing Aflatoxin and again extracted with 450 g. of fresh dimethyl ether in the same manner as shown above. Such extraction was further repeated six times. After completion of the six extractions, the powder was separated from the liquid dimethyl ether by filtration and allowed to stand at 40° C and 10 mmHg for 1 hour to accomplish a complete removal of residual dimethyl ether therefrom. The results are shown in Table 1. The Aflatoxin was determined according to a method prescribed by the Association of Official Analytical Chemists (frequently referred to herein as AOAC method) which comprises extraction with methanol — 1% aqueous sodium chloride (55:45 by volume), extraction into chloroform and subsequent determination of fluorescence on a silica gel thin layer chromatography.

The same procedures as described above were repeated except that, instead of liquid dimethyl ether, 450 g. of a mixture of liquid dimethyl ether with varied water content was employed as indicated in Table 1. The results are also shown in the same Table.

Table 1

Results of extraction of raw peanuts contaminated with 450 ppb of Aflatoxin with a solvent system of liquid dimethyl ether-water having varied water content

| Water content of the system, % (w/v) | 0 | 1 | 3 | 6.1 | 30 |
|---|---|---|---|---|---|
| Concentration of the remaining Aflatoxin, ppb | 400 | 350 | 10 | 9 | 95 |
| Amount of the residual defatted peanuts*, g | 69.0 | 69.7 | 68.7 | 68.5 | 63.0 |

*calculated on the dry basis.

EXAMPLE 1

Raw peanuts (water content 7.9%, crude fat 47.9% and crude protein 28.2%) contaminated with 1,000 ppb of Aflatoxin were pulverized by means of a silent cutter and passed through a 12 mesh sieve. Into a 2 litersvolume continuous extraction tower was charged 400 g. of the peanut powder thus obtained and subsequently continuous extraction was effected with a flow rate of 0.1 liter/min. of liquid dimethyl ether at room temperature for 60 hours. After completion of the extraction, the liquid dimethyl ether solution was filtered off to leave the peanut powder (260 g.), analysis of which showed a total residual amount of Aflatoxin ($B_1$ and $B_2$) of 800 ppb (water content 4.2%, crude fat 0.9% and crude protein 43.3%).

The defatted peanut (50 g., containing 800 ppb of Aflatoxin) of a low protein denaturation obtained as above was placed into a 1 liter-volume pressure resistant vessel equipped with a magnetic stirrer.

Subsequently, 25 ml. of water was added thereto and extraction was effected with 70 g. of liquid dimethyl ether while stirring for 1 hour. The 6.1% water saturated liquid dimethyl ether solution containing Aflatoxin was filtered off and the residue again extracted with 70 g. of liquid dimethyl ether. Such extraction procedures were repeated six times to yield 42.5 g. of the defatted peanut powder as an end product. The powder was treated in the same manner as mentioned above for the complete removal of the solvent and analyzed to show an Aflatoxin concentration of 6 ppb, which means a substantially complete removal, as well as water content 5.0%, crude fat 0.8% and crude protein 51.0%.

EXAMPLE 2

A peanut meal contaminated with 1.2 ppm Aflatoxin (prepared by pressing and extracting with n-hexane) was pulverized by means of a mixer and passed through a 48 mesh sieve to gather 100 g. of the peanut meal (water content 2.5%, crude fat 3.0% and crude protein 48.0%). The meal was well kneaded with 200 ml. of water and placed into the same extraction vessel as in Experiment 1. Then, 450 g. of liquid dimethyl ether was added thereto and stirring was continued for 1 hour. The liquid dimethyl ether solution containing Aflatoxin (saturated with about 6% water) was transferred into a separate cooled pressure resistant vessel and the liquid dimethyl ether was recovered. The so recovered liquid dimethyl ether (450 g.) was placed into a 1 liter-volume pressure resistant vessel and reused for a subsequent extraction. Such extraction procedures were repeated nine times. The treated peanut powder thus obtained was subjected to the treatment for complete removal of the solvent to yield 98 g. of a peanut powder containing no substantial Aflatoxin, analysis of which showed Aflatoxin content 4 ppb, water content 5.2%, crude fat 0.4% and crude protein 49.0%.

EXAMPLE 3

Raw peanuts contaminated with 450 ppb of Aflatoxin were pulverized by means of a mixer and passed through a 20 mesh sieve to obtain 200 g. of a peanut powder (water content 8.2%, crude fat 45.2% and crude protein 26.7%). The peanut powder thus obtained was placed into a 1 liter-volume pressure resistant extraction vessel and extraction was effected with 200 g. of water-saturated liquid dimethyl ether (containing 6.1% by weight of water) at room temperature while stirring for 40 minutes. After completion of the extraction, the liquid dimethyl ether solution was filtered off and the peanut powder thus separated was again extracted with a fresh 200 g. portion of water-saturated liquid dimethyl ether under the same conditions as mentioned above. Such extraction procedures were repeated seven times. Subsequently, similar extraction procedures were further effected by the use of 200 g. of liquid dimethyl ether free of water and once more repeated. Raw peanut powder was separated from the liquid dimethyl ether and the residual dimethyl ether was completely removed therefrom at 40° C. under reduced pressure for 1 hour. The peanut powder thus obtained (89 g.) was analyzed to show a total Aflatoxin ($B_1$ and $B_2$) content 9 ppb, water content 2.7%, crude fat 0.9% and crude protein 52.0%.

EXAMPLE 4

Raw peanuts contaminated with 1,000 ppb of Aflatoxin pulverized by means of a meat chopper and passed through a 12 mesh sieve to yield 100 g. of a peanut powder (water content 7.8%, crude fat 52.8% and crude protein 26.5%). The powder thus obtained was placed into a 300 ml.-volume pressure resistant column with an inner diameter of 45 mm. Subsequently, water-saturated liquid dimethyl ether was slowly passed therethrough at a flow rate of about 6 ml./min. until a 2-liter volume thereof was consumed. The water-saturated liquid dimethyl ether remaining in the column was completely recovered into a separate vessel with a difference in temperature. The peanut powder taken out of the column was then dehydrated with two 150 g. portions of liquid dimethyl ether free of water. The raw peanut powder thus obtained was separated from the liquid dimethyl ether and the residual dimethyl ether was completely removed therefrom at 40° C. under reduced pressure for 1 hour. The raw peanut powder (40 g.) was analyzed to show Aflatoxin content 4 ppb, water content 5.1%, crude fat 0.2% and crude protein 54.2%.

EXAMPLE 5

The peanut meal contaminated with 1,200 ppb of Aflatoxin (200 g., employed in the Example 3 through a 48 mesh sieve) was extracted with 400 g. of water-saturated liquid dimethyl ether while stirring at room temperature for 40 minutes. After completion of the extraction, the liquid dimethyl ether solution was separated by filtration from the peanut meal powder, passed, as it was, through an 100 ml-volume pressure resistant column packed with 50 g. of granular activated carbon (sold under tradename "Ajiencoal" and manufactured by Ajien K. K., Japan) to adsorb thereon the Aflatoxin in the solution. 400 g. of the liquid dimethyl ether recovered from the activated carbon column was again mixed with the peanut meal powder and extraction was effected at room temperature with stirring for 40 minutes. Such procedures were repeated six times. Then, twice extractions were effected with 200 g. of liquid dimethyl ether free of water followed by drying. The so obtained peanut meal powder was treated in the same manner as mentioned above to remove the solvent therefrom completely. The peanut meal powder (102 g.) was analyzed to show Aflatoxin content 10ppb, water content 4.9%, crude fat 0.3% and crude protein 49.7%.

EXAMPLE 6

Raw peanuts contaminated with 950 ppb of Aflatoxin were pulverized and sieved in the same manner as in Example 5 to yield 800 g. of the 20 mesh-through meal (water content 8.2%, crude fat 49.7% and crude protein 25.7%). The meal was charged into the same 2-liter volume extraction tower as in Example 1 and continuous extraction was effected with liquid dimethyl ether free of water at a flow rate of 0.2 liter/min. and room temperature for 1 hour. The tower was subsequently equipped with a 300 ml-volume pressure resistant column containing 150 g. of granular activated carbon and water-saturated liquid dimethyl ether was passed through the tower and column at a flow rate of 100 ml./min. for 2.5 hours. After completion of the extraction, drying and solvent removing procedures were conducted in the same manner as in Example 5 to yield 382 g. of a peanut powder, analysis of which showed Aflatoxin content 12 ppb, water content 6.2%, crude fat 0.4% and crude protein 50.2%.

EXAMPLE 7

Cotton seed cake contaminated with 200 ppb of Aflatoxin was pulverized by means of a mixer and passed through a 20 mesh sieve. The resulting cotton seed cake powder (100 g.) was charged into the same 1 liter-volume pressure resistant vessel as in Example 3 and 100 ml. of water was added thereto. Then, extraction was effected with 300 g. of liquid dimethyl ether while stirring at room temperature for 30 minutes. Thereafter, a water saturated liquid dimethyl ether solution containing Aflatoxin was filtered off and the residual cotton seed cake powder was again extracted with a fresh 300 g. portion of liquid dimethyl ether. Such procedures were repeated six times. The cotton weed cake powder thus obtained was treated under the same conditions as mentioned above to remove the residual liquid dimethyl ether. Yield 93 g.; Aflatoxin content 3 ppb.

What is claimed is:

1. A method for the removal of Aflatoxin from cereals, oil seeds and feedstuffs contaminated therewith which comprises subjecting said cereals, oil seeds and feedstuffs to at least one extraction with liquid dimethyl ether and water at temperatures not higher than those at which any proteins in said materials are thermally denaturated, said water being employed in an amount of 2 to 8% by weight with respect to the liquid dimethyl ether.

2. A method according to claim 1 wherein the water is employed in an amount of 3 to 7% by weight with respect to the liquid dimethyl ether.

3. A method according to claim 1 wherein the water is employed in an amount of saturation sōlubility to liquid dimethyl ether.

4. A method according to claim 1 wherein the liquid dimethyl ether is mixed with water and introduced into the extraction system.

5. A method according to claim 1 wherein the whole amount of the water is once introduced into the extracting system and the liquid dimethyl ether is stepwise added to the system in each extraction step.

6. A method according to claim 1 wherein said cereal, oil seed and feedstuff are raw or processed.

7. A method according to claim 1 wherein said oil seed is a raw peanut, a peanut meal or a cotton seed meal.

8. A method according to claim 1 wherein said temperatures are between 30° and −30° C.

9. A method according to claim 1 which further comprises contacting the liquid dimethyl ether — water system discharged from the extraction system and containing Aflatoxin with activated carbon to adsorb the Aflatoxin in said activated carbon, thus regenerating the liquid dimethyl ether — water system.

* * * * *